ns Patent Office 3,013,861
Patented Dec. 19, 1961

3,013,861
PROCESS FOR PRODUCING HYDROXIDES
Arvel O. Franz, Cartersville, Ga., assignor to Chemical Products Corporation, Cartersville, Ga., a corporation of Georgia
No Drawing. Filed Oct. 8, 1958, Ser. No. 765,938
25 Claims. (Cl. 23—184)

This invention relates to the conversion of water soluble sulfides into hydroxides and hydrosulfides and more particularly relates to the conversion of normal alkali metal, alkaline earth metal, ammonium or substituted ammonium hydroxides and hydrosulfides.

Alkali sulfides are by-products of many currently employed commercial processes. In some such processes, for example, the purification of hydrocarbon gases by alkaline solution washes, the by-product sulfide is of limited commercial value and often constitutes a serious disposal problem. An economically attractive method of converting such sulfides to caustic alkalis would reduce the total quantities of caustic required for the operation and at the same time would yield a saleable byproduct and/or reduce or eliminate the disposal problem. Alkali sulfides may also be prepared from naturally occurring or chemically produced sulfates by known reduction processes. An economically feasible process for producing hydroxides, and especially barium hydroxide, from such low cost starting materials would be of great importance to the art.

Barium hydroxide is a well known compound of commerce which has been produced heretofore by a variety of economically and procedurally unsatisfactory methods. In one known process, for example, barium carbonate is reacted with carbon at a high temperature, as in an electric furnace, the resulting impure oxide being dissolved in water and recrystallized. In another prior art process, barium carbonate or barium sulfate is treated with silica in a rotary kiln at very high temperature to produce a dibarium silicate which is then hydrolized to produce a dilute solution of barium hydroxide and monobarium silicate which must be recycled. These and similar processes for the production of barium hydroxide are costly, and involve the use of high temperature and costly raw materials as well as excessive recycling of intermediates.

Methods of producing barium hydroxide from readily available barium sulfide have long been sought. The desirability of a commercially satisfactory process of producing barium hydroxide from barium sulfide is attested by the number of literature and patent references suggesting various processes, none of which has met the test of commercial use. Processes attempted have included the recrystallization of very dilute solutions, causticization with many equivalents of a free base, reacting the sulfide with the oxide of a heavy metal, and various attempts to complex the sulfur such as by oxidation to a polysulfide. All of these prior art processes have been characterized by low yields, impure products, excessive raw material costs and/or the requirement for recycling large quantities of intermediates. Moreover, barium hydroxide has never been produced by wet processes in yields even approaching commercial acceptability without externally introducing the hydroxyl radical. Even then, as shown by U.S. Patent 2,782,099, where barium sulfide is reacted with sodium hydroxide to produce barium hydroxide, not more than six weight percent of barium sulfide may be present in the reaction mixture, while the sodium hydroxide concentration must be several times the barium sulfide content. In the optimum process disclosed by U.S. Patent 2,782,099 a solution containing 18.8% of sodium hydroxide is employed and a yield of only 4.2% of barium hydroxide is obtained representing a usage of 18 moles of sodium hydroxide per mole of barium hydroxide produced.

A primary object of the present invention is an economical, commercially feasible process for producing alkali metal, alkaline earth metal, ammonium and substituted ammonium hydroxides from their water soluble sulfides without the operating difficulties, expensive reagents or useless by-products of prior art processes.

An additional object of the invention is an economically commercially feasible process for producing alkali metal, alkali earth metal, ammonium and substituted ammonium hydroxide and valuable by-product hydrosulfides from water-soluble sulfides, without introducing hydroxyl radicals from an external source.

Yet another object of the invention is the economical production of commercial yields of barium hydroxide from barium sulfide without the operating difficulties, excessive reagents or useless by-products characterizing prior art processes and without externally introducing a source of hydroxyl radical.

Generally described the present invention is a process for preparing a hydroxide which comprises forming an aqueous solution of a water soluble sulfide, passing the solution through a body of internally bifunctional ion exchange resin and eluting said body selectively to recover the hydroxide of the cation of the sulfide. Pursuant to this process hydroxides are formed in yields approaching theoretical and at high strength. The by-product of the process is a substantially theoretical yield of the corresponding sulfhydrate—a readily usable and/or saleable commodity. The only other reagent employed in producing this end result is water. The process of the invention is simple in operating detail, requires no expensive reagents and produces no useless by-products.

As employed in the present specification and claims, the term "internally bifunctional resin" means a resin containing in one and the same body, anion exchange sites and cation exchange sites so intermingled as to be capable of existing in dynamic equilibrium with each other and with ions in solution. When acting in such a manner the total effect is differentially to delay the passage of the various ionizable compounds through the resin.

In accordance with the invention, it has been discovered that the internally bifunctional ion exchange resins possess the novel property of splitting or disproportioning water-soluble sulfides in aqueous solutions into free bases and their corresponding sulfhydrates. During passage of the sulfide solution through a body of such bifunctional ion exchange resin, a hydroxyl group and a sulfhydrate group are differentially retarded, so that a solution enriched in one of the desired constituents reaches the discharge point of the resin body in advance of a solution impoverished in that constituent. The body of the internally bifunctional ion exchange resin may then be eluted with water to recover selectively the less retarded constituent and the more retarded constituent. Whether or not the hydroxyl group or the sulfhydrate group first reaches the discharge point will depend upon the specific nature of the internally bifunctional ion exchange resin.

In order to improve the economy of the process, increase yield and purity of the product, and secure the by-product sulfhydrate at a more favorable strength the height of the column may be increased, or intermediate fractions or the more dilute final washes may be recycled in known manner. In a preferred embodiment of this invention, recycling of the product fraction was used to secure a barium hydrate fraction of barium hydroxide content in excess of half the molar strength of the feed (thereby reducing the evaporation required in the production of the finished product), and of improved purity.

One class of internally bifunctional ion exchange resin operable in the invention is known as Retardions (trademark) or snake cage polyelectrolytes, and is described in considerable detail in Hatch et al., Preparation and Use of Snake-Cage Polyelectrolytes, Industrial and Engineering Chemistry, vol. 49, No. 11, page 1812. The term snake-cage is aptly descriptive of the structure of this particular class of operable resins, viz., a cross-linked polymer system containing a physically trapped linear polymer. Because of the physical entrapment of the linear snake within the cross-linked cage, solvents merely swell the system, but do not effect a separation of the components of the resin.

In one form of operable internally bifunctional ion exchange resin of the snake-cage type, the cross-linked or cage portion of the resin may be prepared by reacting an amine with a halomethylated co-polymer of a monovinyl aromatic compound and preferably about .5 to 20% by weight of a polyvinyl aromatic compound. Suitable halomethylating agents include chloromethyl methyl ether and bromomethyl methyl ether. Suitable monovinyl compounds include styrene, ar-methylstyrene, ar-chlorostyrene, ar-dimethylstyrene, vinyl-naphthalene, ar-methylvinylnaphthalene, while suitable polyvinyl aromatic compounds include divinylbenzene, ar-divinyltoluene, ar-divinylxylene, divinylnaphthalene, ar-divinylethylbenzene. Operable tertiary amines include dimethylethanolamine, methyldiethanolamine, dimethylisopropanolamine, methyldiisopropanolamine and 1-dimethylamino-2,3-propanediol. Such resins and their preparation are well known in the art and are discussed for example in U.S. Patents 2,606,098 and 2,614,099 to Bauman and are commercially produced under the trademark Dowex anion exchange resins by Dow Chemical Co., under the name Amberlite IRA by the Rohm & Haas Co., and under other names and designations by other producers.

The snake portion of the internally bifunctional ion exchange resin may be produced by polymerizing acrylic or methacrylic acid or the like within the physical structure of the cross-linked cage resin as described in detail in the previously referred to Hatch et al. article.

In resins which are operable within the limits of this invention, one portion of the internally bifunctional resin will be anionic, and the other portion cationic. Preferably the anion exchange site will be selected from cationic groups consisting of quaternary ammonium, tertiary ammonium, ammonium, pyridinium and morpholinium radicals and the cation exchange site will be selected from anionic groups consisting of carboxylic and sulfonic acid radicals. Other anion and cation exchange sites may be employed. Preferably the "cage" portion of the resin will contain the anion exchange site and the "snake" portion will contain the cation exchange site.

Other means of obtaining internal bifunctionality may be employed. For example, a straight chain or partially cross-linked vinyl aromatic polymer may be partially halomethylated, sulfonated, and reacted with an amine in any desired order. In the resulting resin the anion and cation exchange sites occupy positions on the same base chain. Alternatively an anion exchange resin and a cation exchange resin may be melted and mixed or dissolved in a common solvent and co-deposited by the removal of the common solvent. An operable internally bifunctional resin also may be synthesized in which both functional sites are an integral portion of the resin, as for example in the resins produced by reaction of hexamethylene tetramine and furfural as described by Hojyo and Kotera in Journal of the Chemical Society of Japan, Industrial Chemical Sect., vol. 55, pp. 733–36 and 792–94. The characteristics of the internally bifunctional resins operable in the invention may be altered by a choice of the anion and cation exchange radicals and their relative amounts.

For economic reasons, it is often desirable to employ a saturated feed solution. However, solution concentrations will depend primarily on economic considerations and solutions less than saturated may be employed if desired.

All water-soluble sulfides are operable in the present invention, including the alkali metal, alkaline earth metal, ammonium and substituted ammonium sulfides. Calcium and magnesium, however, have oxides and hydroxides of such limited solubility in water as to limit their utility in the process of the invention. Similarly some sulfides possibly may exhibit sufficient attack on a particular internally bifunctional ion exchange resin to render the particular combination somewhat less attractive in terms of resin life. In accordance with the invention however, aqueous solutions of the sulfides of sodium, lithium, potassium, barium, strontium, ammonium, (and substituted ammonium sulfides such as ethanolamine and morpholine sulfides) and the like may be split or disproportioned by passage through a body of internally bifunctional ion exchange resin to form solutions of the hydroxides and the corresponding hydrosulfides.

As will be apparent, the process of the invention has its greatest utility under conditions where there is a readily available use or market both for the hydroxide formed and the hydrosulfide by-product. For example, barium hydrosulfide may be readily converted to pure barium carbonate or barium chloride, by known processes. Where sodium sulfide is disproportioned in accordance with the invention, the sodium sulfhydrate by-product may be employed as a source of hydrogen sulfide for metallurgical processes or for conversion to free sulfur, a thiosulfate or other sulfur compounds. In the preparation of hydrogen sulfide a further advantage accrues from hydrosulfides in that only half as much acid is required for the generation of a given amount of gas from a hydrosulfide as compared with the comparable sulfide.

Having generally described the process of the invention the following examples are presented in order to illustrate various specific embodiments thereof. The generic scope of the invention, however, is not limited to the specific embodiments to be exemplified.

*Example I*

A glass tube 1 inch internal diameter and 30 inches long was filled to a depth of 27 inches with Retardion 11A8 in the hydroxide form and thoroughly washed. (Retardion 11A8 is a trademarked product of the Dow Chemical Company comprising an 8% cross-linked Dowex 1 poly-quaternary ammonium cage impregnated with a "snake" of the polyacrylic acid type substantially equal in number of functional groups to the cage resin.) The tube was equipped with a water jacket and was maintained at 60° C. by circulating water at that temperature through the jacket. Two hundred ml. of 1.5 normal barium sulfide was added to the column over a period of 15 minutes. After the 200 ml. of feed solution was added to the column, 1500 ml. of water was added at the rates of 900 ml./hr. The column was operated cyclicly in this manner for several cycles to eliminate the abnormal behavior of fresh resin. After these preliminary cycles the effluent from the column was analyzed in ten ml. increments for hydroxide and sulfhydrate content. The analysis of the eluate fraction showed that 190 ml. of barium hydroxide solution .7 normal on barium hydroxide and .07 normal in barium sulfide could be withdrawn as a separate fraction. From this fraction, barium hydroxide of over 99% purity separated on cooling. Following this fraction a progressively more dilute eluate containing barium sulfhydrate with a little barium sulfide was obtained. This solution may be carbonated by known processes to produce barium carbonate. At the conclusion of this cycle, the eluate was substantially pure water, and another increment of barium sulfide solution could be added and the process repeated indefinitely.

Example II

Into a column assembled as described in Example I and maintained at 50° C. was charged 100 ml. of 20° Bé. (at 50° C.) sodium sulfide solution followed by wash water. After several such cycles to condition the resin, the eluate was analyzed in 10 ml. increments for hydroxide and sulfhydrate contents. From the bottom of the column was withdrawn first 100 ml. of almost sulfide free caustic soda solution containing 6.5 grams of NaOH followed by 250 ml. of solution containing 9.3 grams of NaSH and 7.8 grams of $Na_2S$. At the end of this cycle the eluate was substantially pure water and another cycle could be started.

Example III

Into a column assembled as described in Example I and maintained at room temperature was charged 125 ml. of a solution containing 5.8 grams of lithium sulfide, followed by 375 ml. of water. After several cycles to establish equilibrium, a cycle was analyzed in 10 ml. increments. From the bottom of the column was withdrawn first 140 ml. of a solution containing 3.7 grams of lithium hydroxide with only a trace of lithium sulfide, and then 360 ml. of a solution containing 3.8 grams of lithium sulfhydrate, and some free hydrogen sulfide. This represents more than a theoretical yield according to the equation $$Li_2S + H_2O = LiOH + LiSH$$

and indicates that in this case at least some splitting occurs according to the equation.

$$LiSH + H_2O = LiOH + H_2S$$

Example IV

Into a column as described in Example I and maintained at 50° C. was charged 100 ml. of potassium sulfide solution containing 4.2 grams of potassium sulfide. From the bottom of the column was extracted first a solution containing potassium hydroxide and then over a long period a solution containing potassium sulfhydrate.

Example V

Into a column assembled as described in Example I and maintained at 50° C. was charged 100 ml. of a solution containing 3.6 grams of strontium sulfide followed by 700 ml. of water. This addition was repeated through several cycles to reach equilibrium. From the bottom of the colum was withdrawn first, 120 ml. of solution containing 1.4 grams of strontium hydroxide and only a trace of sulfide, and then 700 ml. of solution containing 1.2 grams of strontium sulfhydrate and 1.2 grams of strontium sulfide.

Example VI

The column assembled as described in Example I and maintained at room temperature was charged with 100 ml. of ammonium sulfide solution containing 6.5 grams of ammonium sulfide, followed by 450 ml. of water. After several such cycles to reach equilibrium, a complete cycle was analyzed in 10 ml. increments. From the bottom of the column was withdrawn first 100 ml. of solution containing 2.7 grams of ammonium hydroxide and .75 gram of ammonium sulfide followed by 450 ml. containing 3.75 grams of ammonium sulfhydrate and .57 gram of ammonium sulfide.

Example VII

A three inch internal diameter glass pipe forty-eight inches in length was fitted as an ion exchange column and immersed in a constant temperature water bath maintained at 50° C. It was charged with 4 liters of Retardion 11A8 (the internally bifunctional ion exchange resin described in Example I). At 4 hour intervals, 1.5 liters of 1.72 normal commercial barium sulfide solution containing 210 grams of barium sulfide were added to the column followed by wash water. The feed and wash water were added alternately as such a rate sufficient to keep the resin bed flooded at all times while withdrawing liquid from the bottom at a rate of about 100 ml. per minute. At weekly intervals complete cycles of eluate were carefully analyzed to determine the useful life of the resin.

After cycling in the manner described continuously for ten weeks, the barium hydroxide fraction of the eluate from one cycle was subdivided into "forerun" consisting of that portion averaging below .5 normal in barium hydroxide and low in sulfide, "mid-run" consisting of that fraction averaging over .5 normal in barium hydroxide and low in sulfide, and "after-run," consisting of that fraction which contained an excess of hydroxide over sulfide but with considerable sulfide. A new cycle was started in which the feed consisted of fore-run, mid-run, after-run, and 1.5 liters of fresh feed in that order. The eluate was again subdivided in the same manner, and again recycled in the same manner. This was continued through four complete cycles. With each successive recycle, the mid-run fraction became stronger, larger, and purer, the fore-run becoming slightly larger, the after-run remaining about constant in composition and quantity. On the fifth, and for many successive cycles thereafter, 1 liter of the strongest and purest fraction of the mid-run was withdrawn from the cycle as "product." This fraction had an average analysis of about 1.18 normal in $Ba(OH)_2$ and .01 normal in reducing sulfur compounds calculate as BaS. This fraction therefore contained about 101 grams of $Ba(OH)_2$ or 95% of the barium hydroxide theoretically obtainable according to the equation:

$$2BaS + 2H_2O = Ba(OH)_2 + Ba(SH)_2$$

By means of this method of recycling, however, this high yield of barium hydroxide is concentrated in 33% smaller volume than simple splitting would permit, despite the weakening influence of diffusion and dilution. The solution so obtained was cooled to 0° C. and yielded 155 grams of barium hydroxide octahydrate analyzing over 99.9 mole percent barium hydrate and less than .1 mole percent of reducing compounds calculated as barium sulfide. The mother lye from this crystallization contained 17 grams of barium hydroxide and is suitable for recycling through the column, or may be evaporated for the recovery of further quantities of barium hydroxide, or used in the manufacture of other barium chemicals.

It is easily seen that the equivalent of this method of recycling can also be secured by the use of a multiplicity of contacting vessels equipped with suitable valves.

Example VIII

Retardion 41A4 was charged into an ion exchange column 1 cm. in internal diameter to a depth of 87 cm. (a bed volume of 67 ml.). Retardion 41A4 is a snake-cage type of internally bifunctional ion exchange resin having a polyquarternary ammonium "cage" crosslinked with 4% divinyl benzene and containing a polycarboxylic acid "snake." The column was surrounded with a circulating water jacket maintained at 50° C. The column was charged with 100 ml. of .71 normal BaS solution followed by 500 ml. of water. Five complete cycles of operation were conducted in order to reach equilibrium and the sixth cycle then was analyzed.

The barium hydroxide fraction of this cycle consisted of 75 ml. analyzing .42 normal in Ba(OH)$_2$, equivalent to an 89% yield. The sulfhydrate fraction was completely eluted under these conditions.

As previously discussed, it is immaterial in the operation of this invention whether the sulfhydrate or the hydroxyl ion is most retarded. However, it is fundamental that the ion which is least retarded will be recovered with less dilution than the ion which is more retarded. In Example IX a resin which is more selective towards hydroxyl ion is produced according to the previously described method of Hojo and Kotera.

*Example IX*

One hundred thirteen grams (0.8 mole) of hexamethylene tetramine was dissolved in 300 ml. of 10% hydrochloric acid and to this solution was added 233 g. (2.4 moles) of commercial furfural. The resulting dark solution was placed in a 2 liter 3 necked flask equipped with a dropping funnel, a stirrer, and a thermometer. The mixture was stirred and cooled to below 5° C. Sulfuric acid (98% conc., 244 g., 2.4 moles) was added dropwise with continuous stirring, care being taken to hold the temperature below 5° C. After the addition of acid the temperature was permitted to rise to 16–18° C. and held for 30 hours. The dark viscous liquid was transferred to a beaker and placed in a water bath equipped with a thermostat. The temperature of the bath was raised 10° C. per day until a temperature of 75° C. was reached. After 4 days at 75° C. the black, friable, elastic mass was broken up and passed through a six mesh screen. The particulate resin was washed with 3 volumes of water, placed in a loosely stoppered flask, and returned to the water bath at a temperature of 90° C. for a period of 5 days. The resulting material was hard and strong with a clean fracture and resembled coal in appearance. This material was washed thoroughly, was air dried and a portion was crushed to substantially 40 x 80 mesh. The resin so produced exhibits definite amphoteric ion exchange capacities, having an anion exchange capacity of about 1.8 meq./cc., and a cation exchange capacity of 2.5 meq./cc.

*Example X*

One hundred cubic cm. of the resin described in Example IX having a screen size of —40 mesh and +80 mesh was charged into a conventional laboratory ion exchange column to give a resin bed 30″ in depth. The bed was washed with 1 normal HCl to convert cation exchange sites to the acid form, and anion exchange sites to the chloride form. The bed was then washed with 1 normal ammonium hydroxide solution to convert the anion exchange sites to the hydroxide form, and then with many volumes of deionized water to elute the ammonium hydroxide. The column was then repeatedly cycled with 50 ml. of 7% barium sulfide solution followed by 300 ml. of water. After 10 such cycles to equilibrate the resin, one cycle of eluate was analyzed in detail.

There was eluted from the column first 60 ml. containing 1.5 grams of Ba(SH)$_2$ and .1 gram of BaS followed by a fraction which contained both barium sulfide and barium hydroxide, and then, a volume of 250 ml. of solution containing substantially only Ba(OH)$_2$ in decreasing concentrations. At the end of this volume the eluate was substantially pure water, and the cycle could be repeated as desired.

While the invention has been illustrated specifically with reference to an ion exchange column, it is not intended that the method of the invention be limited to this single application, but instead that it may be used in any ion exchange equipment such as continuous countercurrent contactors, the so-called "resin-in-pulp process," or other equipment suitable for bringing liquids and solids into contact.

Since the process of the invention may be subject to modification by those skilled in the art without departing from the scope thereof, it is intended that the invention be limited solely by the appended claims.

I claim:

1. A process for preparing hydroxides comprising forming an aqueous solution of a water-soluble sulfide containing a cation which forms an hydroxide with an hydroxyl ion, passing said solution through a body of internally bifunctional ion exchange resin and eluting said body of resin with water to recover the hydroxide of the cation of said sulfide.

2. A process for preparing hydroxides comprising forming an aqueous solution of a water-soluble sulfide containing a cation which forms an hydroxide with an hydroxyl ion, passing said solution through a body of internally bifunctional ion exchange resin and eluting said body of resin with water selectively to recover the hydroxide and sulfhydrate of the cation of said sulfide.

3. A process according to claim 2 in which the water-soluble sulfide is an alkaline earth metal sulfide.

4. A process according to claim 2 in which the water-soluble sulfide is barium sulfide.

5. A process according to claim 2 in which the water-soluble sulfide is strontium sulfide.

6. A process according to claim 2 in which the water-soluble sulfide is an alkali metal sulfide.

7. A process according to claim 2 in which the water-soluble sulfide is sodium sulfide.

8. A process according to claim 2 in which the water-soluble sulfide is lithium sulfide.

9. A process according to claim 2 in which the water-soluble sulfide is an ammonium sulfide.

10. A process for preparing hydroxides comprising forming an aqueous solution of a water-soluble sulfide selected from the group consisting of alkali metal sulfides, alkaline earth sulfides, ammonium sulfide and substituted ammonium sulfide, passing said solution through a body of internally bifunctional ion exchange resin, one portion of said resin being anionic and the other portion being cationic, and eluting said body of resin with water to recover the hydroxide of the cation of said sulfide.

11. A process according to claim 10 in which the water-soluble sulfide is an alkaline earth metal sulfide.

12. A process according to claim 10 in which the water-soluble sulfide is barium sulfide.

13. A process according to claim 10 in which the water-soluble sulfide is strontium sulfide.

14. A process according to claim 10 in which the water-soluble sulfide is an alkali metal sulfide.

15. A process according to claim 10 in which the water-soluble sulfide is sodium sulfide.

16. A process according to claim 10 in which the water-soluble sulfide is lithium sulfide.

17. A process according to claim 10 in which the water-soluble sulfide is ammonium sulfide.

18. A process comprising forming an aqueous solution tion of a water-soluble sulfide containing a cation which forms an hydroxide with an hydroxyl ion, passing said solution through a body of internally bifunctional ion exchange resin, one portion of which is anionic and the other portion of which is cationic, the anion exchange site being selected from the group consisting of quaternary ammonium, tertiary ammonium, ammonium pyridinium and morpholinium radicals, and the cation exchange site being selected from the group consisting of carboxylic and sulfonic acid radicals, and then eluting said body of resin with water to recover the hydroxide of the cation of said sulfide.

19. A process according to claim 18 in which the water-soluble sulfide is an alkaline earth metal sulfide.

20. A process according to claim 18 in which the water-soluble sulfide is barium sulfide.

21. A process according to claim 18 in which the water-soluble sulfide is strontium sulfide.

22. A process according to claim 18 in which the water-soluble sulfide is an alkali metal sulfide.

23. A process according to claim 18 in which the water-soluble sulfide is sodium sulfide.

24. A process according to claim 18 in which the water-soluble sulfide is ammonium sulfide.

25. A process according to claim 18 in which the water-soluble sulfide is lithium sulfide.

References Cited in the file of this patent

UNITED STATES PATENTS

| | | |
|---|---|---|
| 2,275,210 | Urbain | Mar. 3, 1942 |
| 2,606,098 | Bauman | Aug. 5, 1952 |
| 2,707,670 | Munekata et al. | May 3, 1955 |

OTHER REFERENCES

"Chemical and Engineering News," vol. 35, No. 16, Apr. 22, 1957, p. 82.

Hatch et al. article in Industrial and Engineering Chemistry, vol. 49, No. 11 (1957), pp. 1812–19.